(12) United States Patent
Deng

(10) Patent No.: US 11,555,446 B2
(45) Date of Patent: Jan. 17, 2023

(54) HYBRID POWER PLANT WITH CO2 CAPTURE

(71) Applicant: Mitsubishi Power Americas, Inc., Lake Mary, FL (US)

(72) Inventor: Benjamin Shimin Deng, Lake Mary, FL (US)

(73) Assignee: Mitsubishi Power Americas, Inc., Lake Mary, FL (US)

(*) Notice: Subject to any disclaimer, the term of this patent is extended or adjusted under 35 U.S.C. 154(b) by 0 days.

(21) Appl. No.: 17/530,864

(22) Filed: Nov. 19, 2021

(65) Prior Publication Data

US 2022/0397057 A1    Dec. 15, 2022

Related U.S. Application Data

(60) Provisional application No. 63/209,457, filed on Jun. 11, 2021.

(51) Int. Cl.
*F02C 3/34* (2006.01)
*F01D 13/02* (2006.01)
(Continued)

(52) U.S. Cl.
CPC ............... *F02C 3/34* (2013.01); *F01D 13/02* (2013.01); *F01D 15/10* (2013.01); *F02C 6/10* (2013.01);
(Continued)

(58) Field of Classification Search
CPC ...... F02C 3/34; F02C 6/10; F02C 6/18; F01D 13/02; F01D 15/10; F05D 2220/76; F05D 2260/61; F01K 23/10
See application file for complete search history.

(56) References Cited

U.S. PATENT DOCUMENTS

| | | | |
|---|---|---|---|
| 2002/0023423 A1* | 2/2002 | Viteri | F02C 6/18 60/39.182 |
| 2002/0043064 A1* | 4/2002 | Griffin | F02C 3/34 60/311 |

(Continued)

OTHER PUBLICATIONS

"Fuel Cell Basics—A Basic Overview of Fuel Cell Technology", [Online]. Retrieved from the Internet: URL: https:americanhistory.si.edu fuelcells basics.htm, (2017), 6 pgs.

(Continued)

*Primary Examiner* — Steven M Sutherland
(74) *Attorney, Agent, or Firm* — Schwegman Lundberg & Woessner, P.A.

(57) ABSTRACT

A power production facility comprises a power plant that combusts fuel to produce energy for generating electricity and exhaust gas, an emissions capture unit to receive the exhaust gas to remove pollutants, a fuel cell to generate electricity via reaction of constituents and provide byproduct heat to operate the emissions capture unit, and an electrolyzer to generate constituents for the fuel cell from water byproduct received from the fuel cell resulting from the reaction process. A method of generating power with an emissions capture unit comprises providing a hybrid power plant configured to generate hydrogen gas and oxygen gas with an electrolyzer from a water input using an electrical input, generate electricity, heat and the water input with a fuel cell from the hydrogen gas and oxygen gas of the electrolyzer, and capture emissions from exhaust gas with an emissions capture unit using the heat from the fuel cell.

20 Claims, 2 Drawing Sheets

(51) Int. Cl.
  *F01D 15/10* (2006.01)
  *F02C 6/10* (2006.01)
  *F02C 6/18* (2006.01)

(52) U.S. Cl.
  CPC ............ *F02C 6/18* (2013.01); *F05D 2220/76* (2013.01); *F05D 2260/61* (2013.01)

(56) References Cited

U.S. PATENT DOCUMENTS

| | | | | |
|---|---|---|---|---|
| 2005/0223711 | A1* | 10/2005 | Goldmeer | B63G 8/10 60/39.76 |
| 2008/0134660 | A1* | 6/2008 | Finkenrath | F01K 23/10 60/39.52 |
| 2009/0218821 | A1* | 9/2009 | ElKady | F02C 3/34 60/39.52 |
| 2019/0131645 | A1* | 5/2019 | Jahnke | H01M 8/04097 |
| 2021/0115848 | A1* | 4/2021 | Callahan | F02C 3/22 |
| 2021/0218044 | A1* | 7/2021 | Jahnke | B01D 53/326 |
| 2021/0372668 | A1* | 12/2021 | Buscheck | H01M 6/34 |

OTHER PUBLICATIONS

"Hydrogen Oxygen Fuel Cells", Hydrogen Oxygen Fuel Cells an overview |ScienceDirect Topics, 22 pgs.

"Current and Future Technologies for Natural Gas Combined Cycle (NGCC) Power Plants", National Energy Technology Laboratory, (2013), 251 pgs.

Buchi, F, "On the Efficiency of H2 O2 Automotive PE Fuel Cell Systems", 3rd European PEFC Forum, Session B09, Thursday, Jul. 7, FileNo. B091, (2005), 2 pgs.

Dell, Ronald M, "Fuel Cell Efficiency", PEM Fuel Cells, (2005), 19 pgs.

Goto, Kazuya, "Potential of Amine-based Solvents for Energy-saving CO2 Capture from a Coal-fired Power Plant", Journal of the Japan Institute of Energy, 95, 1133-1141, (2016), 9 pgs.

Satyapal, Sunita, "Hydrogen and Fuel Cells Overview", Hydrogen and Fuel Cell Technologies Office, (Jun. 14, 2017), 39 pgs.

Weidner, E, "Global deployment of large capacity stationary fuel cells", JRC Technical Reports, European Commission, (2019), 48 pgs.

* cited by examiner

HYBRID POWER PLANT WITH CO2 CAPTURE

PRIORITY APPLICATIONS

This application claims the benefit of priority to U.S. Provisional Patent Application Ser. No. 63/209,457, filed Jun. 11, 2021, the content of which is incorporated herein by reference in its entirety.

TECHNICAL FIELD

This document pertains generally, but not by way of limitation, to power cycles used in gas turbine combined cycle (GTCC) power plants. More specifically, but not by way of limitation, the present application relates to systems for reducing emissions in GTCC power plants.

BACKGROUND

In a gas turbine combined-cycle (GTCC) power plant, the combustor for the gas turbine engine can operate with a variety of fuels. Gas turbine combustors are typically designed for burning natural gas (or liquid) fuel for current large-scale GTCC power plants. Combustion of hydrogen fuel (H2) produces no Carbon dioxide (CO2) emissions. In order to combust H2 in GTCC power plants, the combustion system is typically re-designed to accommodate the differences in properties between natural gas (or liquid fuels) and H2. A typical gas turbine (GT) can handle about 30% to about 50% (vol %) H2 in combination with natural gas. If using a 30/70 or 50/50 split of H2 and natural gas, the turbine inlet temperature (Tlt) for current combustor designs may be reduced (derated) to achieve a similar nitrogen oxide (NOx) emissions level that results from burning natural gas. For example, H2 burns at hotter temperatures and thereby forms more nitrogen in the emissions. Therefore, in order to maintain the same nitrogen oxide (NOx) emissions as natural gas, the GTCC performance will be impacted in terms of power output as well as thermal efficiency due to the derated turbine inlet temperature. Burning 100% H2 fuel is desirable in order to progress the reduction of CO2 emissions for environmental considerations.

OVERVIEW

The present inventor has recognized, among other things, that problems to be solved in power cycles can include the operating penalty that is incurred when using a CO2 capture system with a GTCC operating with one or a combination of natural gas and H2 fuels. Even though blending H2 with natural gas produces less CO2 emissions than burning only natural gas fuel, it is still desirable to minimize or eliminate CO2 emissions and other emissions such as NOx. Thus, many GTCC systems employ CO2 capture systems through which flue gas of the gas turbine engine is finally passed before being released to the environment. Typically employed CO2 capture technology utilizes heat as an input in order to achieve the desired chemical processes involved. Accounting for this heat in GTCC power plants identifies a decrease in overall efficiency of the system.

The present subject matter can help provide solutions to this problem and other problems, such as by using fuel cells and electrolyzers in combination with CO2 capture units to reduce the emissions of GTCC power plants with a higher overall efficiency as compared to conventional GTCC power plants operating with CO2 capture systems in a conventional manner. An electrolyzer can be operated to produce H2 and O2 outputs while simultaneously operating a fuel cell with the H2 and O2 outputs of the electrolyzer to produce water and heat outputs. The water can be used to feed the electrolyzer and the heat can be used as an input for a CO2 capture unit. The added electricity output of the fuel cell can result in overall system efficiency that is greater than using CO2 capture units in a conventional manner (e.g., with heat input from the GTCC power plant), particularly when using renewable energy to provide operating power to the electrolyzer.

In an example, a power production facility can comprise a combined cycle power plant comprising a gas turbine engine configured to combust a fuel to produce exhaust gas that can be used to produce rotational shaft power for generating electricity and a steam system configured to produce steam with the exhaust gas to rotate a steam turbine for generating additional electricity, an emissions capture unit configured to receive the exhaust gas to remove pollutants, a fuel cell configured to generate electricity via a reaction process of constituents and to provide byproduct heat to operate the emissions capture unit, and an electrolyzer configured generate the constituents for the fuel cell from water byproduct received from the fuel cell resulting from the reaction process.

In another example, a method of removing emissions from a combined cycle power plant can comprise providing a hybrid power plant, the hybrid power plant configured to generate hydrogen gas and oxygen gas with an electrolyzer from a water input using an electrical input, generate electricity and heat with a fuel cell from at least the hydrogen gas of the electrolyzer, and transfer at least some of the heat from the fuel cell to an emissions capture unit configured to receive exhaust gas from a gas turbine engine of the combined cycle power plant.

This overview is intended to provide an overview of subject matter of the present patent application. It is not intended to provide an exclusive or exhaustive explanation of the invention. The detailed description is included to provide further information about the present patent application.

Figure 1:
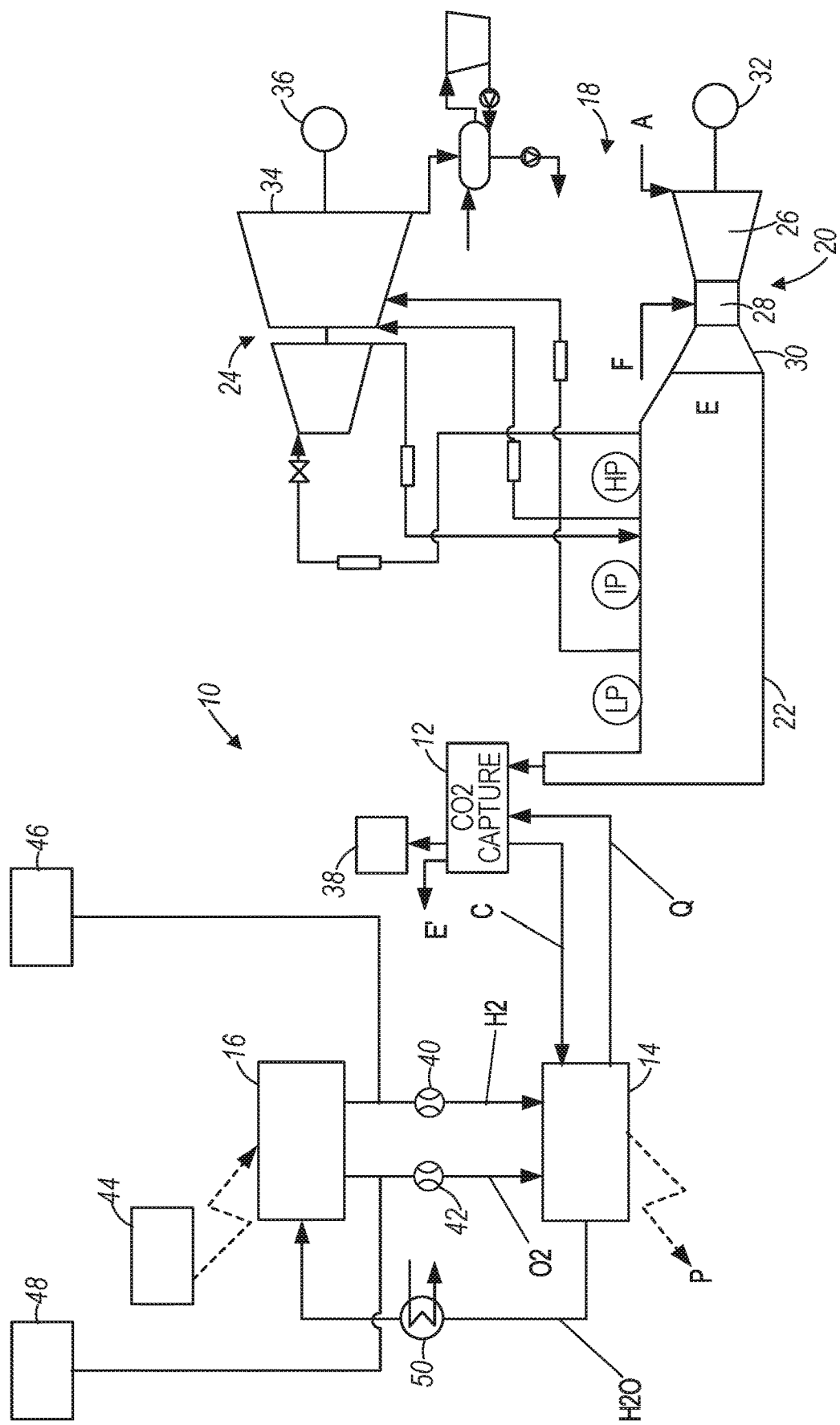
FIG. 1 is a schematic view of a hybrid combined cycle power plant having an emissions capture unit, a fuel cell and an electrolyzer.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

FIG. 1 is a schematic view of hybrid combined cycle power plant 10 having emissions capture unit 12, fuel cell 14 and electrolyzer 16 operating in conjunction with combined cycle power plant 18. Combined cycle power plant 18 can comprise gas turbine engine 20, heat recovery steam generator (HRSG) 22 and steam system 24.

Gas turbine engine 20 can comprise compressor 26, combustor 28 and turbine 30, which can operate with inputs of air A and fuel F to drive electrical generator 32. Gas turbine engine 20 can produce exhaust gas E as a result of combusting air A and fuel F. As is known in the art, heat recovery steam generator (HRSG) 22 can operate a bottoming cycle that utilizes exhaust gas E to heat steam to rotate steam turbine 34 and produce electricity with electrical generator 36. Steam exiting steam turbine 34 can be condensed by other equipment, such as a condenser, to return water to HRSG 22.

Exhaust gas E can pass through HRSG 22 and into emissions capture unit 12, which can capture CO2 from exhaust gas for sequestration or containment at storage unit 38 before exhaust gas E' is released to the atmosphere. Emissions capture unit 12 can operate with an input of heat Q (through low-pressure, LP steam) provided by fuel cell 14 and can output condensate C. Emissions capture unit 12 as used in the hybrid power plants of the present disclosure can comprise CO2 capture units. However, hybrid combined cycle power plant 10 can additionally utilize other types of emissions capture units for NOx, CO and VOC, which can be removed using SCR and CO catalyst.

Fuel cell 14 can produce heat Q and electrical power P as a result of reacting hydrogen gas (H2) from electrolyzer 16. Hydrogen gas H2 can be provided to fuel cell 14 by electrolyzer 16 with the assistance of compressor 40. In examples, as shown in FIG. 1, the O2 produced by electrolyzer 16 can be provided to fuel cell 14 via compressor 42, however, the scope of the disclosure is not so limited, and shall include provision of O2 to fuel cell 14 via other sources, such as atmospheric air, for example. Fuel cell 14 can produce water H2O byproduct that can be fed to electrolyzer 16 to produce H2 and O2 used in fuel cell 14. Likewise, although the embodiment shown in FIG. 1 depicts water provided to the electrolyzer via the H2O byproduct of the fuel cell, the scope of the disclosure is not so limited, and shall include provision of water to the electrolyzer from other sources of water, such as municipal or ground water supply sources, for example.

Electrolyzer 16 can utilize electrical input from power source 44 to convert water H2O into hydrogen gas H2 and oxygen gas O2. The hydrogen gas H2 and oxygen gas O2 output of electrolyzer 16 can be stored in containers 46 and 48, respectively, which may include manufactured containers such as pressure vessels, as well as natural containers, such as caverns, for example. Water H2O flowing from fuel cell 14 to electrolyzer 16 can be cooled using cooler 50.

As described herein, hybrid combined cycle power plant 10 can synergistically utilize cooperative functioning of electrolyzer 16 and fuel cell 14 to operate emissions capture unit 12, thereby improving the overall efficiency of combined cycle power plant 10, as compared to other GTCC power plants that operate emissions capture units with, for example, heat from a heat recovery steam generator and or steam turbine, which thereby decreases output from the bottoming steam cycle.

Fuel cell 14 can comprise an electrochemical device that combines hydrogen and oxygen to produce electricity. Fuel cell 14 is beneficial for having zero or low emissions, high efficiency, byproducts of essentially water and heat, and quiet operation. Fuel cell 14 can utilize various technologies, such as those described herein as well as others. In examples, fuel cell 14 can comprise one or more of five different types of fuel cells: 1] alkali fuel cells (AFC), 2] phosphoric acid fuel cells (PAFC), 3] proton exchange membrane fuel cells (PEMFC), 4] molten carbonate fuel cells (MCFC), and 5] solid oxide fuel cells (SOFC). Fuel cells can also be classified into two categories according to operating temperature: low-temperature (AFC, PAFC and PEMFC) and high-temperature (MCFC and SOFC).

AFC have efficiency of about 70% and operating temperatures of about 150° C. to about 200° C. Output of AFC can be in the range of about 300 W to about 5 kW. AFC typically require pure hydrogen fuel.

PAFC have efficiency in the range of about 40% to about 80%, and operating temperatures in the range of about 150° C. to about 200° C. Output of PAFC can be in the range of about 200 kW to about 11 MW.

PEMFC have efficiency in the range of about 40% to about 50%, and operating temperatures of about 80° C. Output of PEMFC can be in the range of about 50 kW to about 250 kW.

MCFC have efficiency in the range of about 60% to about 80%, and operating temperatures of about 650° C. Output of MCFC can be in the range of about 2 MW to about 100 MW. In MCFC, carbonate ions from the electrolyte are used up in the reactions, making it desirable to inject CO2 to compensate.

SOFC have efficiency of about 60%, and operating temperatures up to about 1,000° C. Output of SOFC can be about 100 kW.

High-temperature fuel cells (MCFC and SOFC) have an advantage in efficiency as they can be more effectively integrated with a thermal power cycle, such as those used in hybrid combined cycle power plant 10, as compared to low-temperature fuel cells (AFC, PAFC and PEMFC). SOFC operate at such high temperature (1,000° C.) that a reformer is not required to extract hydrogen from the fuels. As a result, raw fuels (natural gas, coal, etc.) can be directly fed to the high-temperature fuel cells. Thus, high-temperature fuel cells (MCFC and SOFC) can thus be used as fuel cell 14 in various scenarios. However, there are limitations in application such as high-temperature corrosion, breakdown of cell components, long start-up time and low power density. Furthermore, there can be additional costs in processing the raw fuels.

When hydrogen is extracted from a raw fuel and oxygen is obtained from air, fuel cell technology is more costly to operate due to complicated system requirements, which can result in high capital costs, and extra energy consumption, which can result in lower efficiency. In examples, cryogenic technology used to obtain oxygen from air can result in an 11% reduction in efficiency. Advantages of feeding pure oxygen, as opposed to air, to fuel cell 14 include higher power density, lower catalyst requirement, higher efficiency and no possible cell poisoning due to contaminants from poor ambient air quality.

Based upon current fuel cell technology and state of the art, low-temperature fuel cell types (AFC, PAFC and PEMFC) can be suitable for use as fuel cell 14, considering key criteria such as performance, cost and catalyst. AFC are less expensive to manufacture than other fuel cell types due to relatively inexpensive materials used as catalysts for AFC electrodes, compared to the catalysts (such as platinum) typically used by other types of fuel cells. AFC also have quick start-up capability as they can quickly reach the operational temperature from ambient temperature. In examples, fuel cell 14 can comprise an Alkali Fuel Cell. Examples of fuel cells suitable for use as fuel cell 14 are described in U.S. Pat. No. 4,087,976 to Morrow et al. titled "Electric power plant using electrolytic cell-fuel cell combination," which is incorporated herein by this reference.

Electrolyzer 16 can use electricity to split water H2O into $H_2$ and $O_2$. Examples of electrolyzers suitable for use as electrolyzer 16 are described in U.S. Pat. No. 5,376,470 to Sprouse titled "Regenerative Fuel Cell System," which is incorporated herein by this reference. Cooler 50 can be used to cool water H2O before entering electrolyzer 16. For example, fuel cell 14 can operate at higher temperatures than temperatures at which electrolyzer 16 operates. Cooler 50 can comprise, for example, a heat exchanger that can be supplied with water from a cooling tower.

Electrical input to electrolyzer 16 can be provided by power source 44. In examples, power source 44 can comprise a renewable energy source, such as wind turbines, solar panels or hydro power. The renewable energy sources can be connected to hybrid combined cycle power plant 10 via a grid system or can be renewable energy sources connected directly to hybrid combined cycle power plant 10 or electrolyzer 16.

Furthermore, storage containers 46 and 48 can be used to store excess quantities of H2 and O2, respectively. Thus, hybrid combined cycle power plant 10 can use renewable electricity that is available to either directly power source 44 or, when supply exceeds demand and gas turbine engine 20 is not operating, to generate and store H2 and O2 to be used to power fuel cell 14 when gas turbine engine 20 is in operation. For example, when gas turbine engine 20 is operated, typically all of combined cycle power plant 18 will be operating, thereby also having fuel cell 14 and electrolyzer 16 operating with hybrid combined cycle power plant 10. Thus, gas turbine engine 20, fuel cell 14 and electrolyzer 16 can be operated together as a linked super-system. Electrolyzer 16, however, can be operated independently of gas turbine engine 20, and can thus operate to fill storage containers 46 and 48 when gas turbine engine 20 is not operating.

In conventional GTCC power plants, emissions capture units can utilize various technologies such as those described herein, as well as others, to capture CO2. CO2 capture units can comprise one or more of three types of CO2 capture technologies that are typically used in combination with fossil fuel power plants, such as combined cycle power plant 18: 1] pre-combustion emissions capture, 2] combustion-related emissions capture, and 3] post-combustion emissions capture.

In a first example, emissions capture can be performed pre-combustion, where fuel (e.g., coal, coke or heavy carbonized oil) is first gasified and then syngas (H2+CO) is water-shifted for converting CO to CO2, so that CO2 can be captured from fuel gas before the combustion. In such examples, Selexol can be utilized in processes that can separate acid gases such as hydrogen sulfide and carbon dioxide from the syngas.

In a second example, emissions capture can be performed via oxyfuel combustion, where a process of burning fuel using pure oxygen instead of air is performed. This process results in the removal of the nitrogen component of air such that exhaust gas E is primarily CO2, with the balance being moisture. The CO2 is thus ready to be captured without significant processing required.

In a third example, emissions capture can be performed post-combustion capture, where CO2 is captured from exhaust gas E generated after combusting of a fuel. In examples, a chemical process like MEA (monoethanolamine) is utilized.

The present inventor has recognized that, although pre-combustion capture and oxyfuel combustion can have advantages in effectively capturing CO2, the fuel gasification process can lead to extra loss (i.e. lower efficiency), and producing oxygen from air for Oxyfuel combustion requires significant amounts of auxiliary power. Therefore, use of the first two technologies (fuel gasification or Oxyfuel combustion) result in negligible efficiency improvements at best using current state of the art technology. As such, the present inventor has recognized that post-combustion capture of CO2 is a proven technology that can be readily used with hybrid combined cycle power plant 10. The heat utilized to operate post-combustion emission capture processes, such as solvent regeneration in an MEA unit, can be provided by fuel cell 14.

In an example, emission capture unit 12 can comprise an MEA unit. Exemplary MEA units can first cool and pressurize (to overcome pressure loss of an absorber) exhaust gas E before CO2 in the exhaust gas is captured by lean solvent inside the absorber. Rich solvent from the bottom of the absorber is pumped and preheated before entering a stripper. CO2 is released from the stripper with heat added through a reboiler. In examples, the heat may be provided by low pressure steam. The lean solvent collected at the bottom of the stripper is then cooled and sent back to the absorber.

In examples, a KM-CDR Process™ can be used. Exhaust gas E containing CO2 can be cooled in an exhaust gas cooling tower, then exposed in an absorption tower to alkaline absorbent liquid, which absorbs the CO2 in the exhaust gas. Absorbent liquid containing a high concentration of CO2 is sent to the regeneration tower, where it is heated with steam to release the CO2 and regenerate the absorption liquid. The regenerated absorption liquid is returned to the absorption tower, where it is reused. This process can recover more than 90% of the CO2 contained in exhaust gas E and in some cases the CO2 can have a purity of more than 99.9% by volume.

Examples of MEA units suitable for use as emission capture unit 12 are described in U.S. Pat. No. 4,857,283 to Madden, II titled "Use of Sulfur Dioxide for Corrosion Inhibition in Acid Gas Scrubbing Process" and U.S. Pat. No. 4,477,419 to Pearce et al. titled "Process for the Recovery of CO2 from Flue Gases," both of which are incorporated herein by this reference.

The present inventor has recognized that H2 fuel can be more efficiently utilized in a gas turbine combined cycle (GTCC) by using the H2 as an input to fuel cell 14 rather than burning the H2 fuel in gas turbine engine 20. Instead of burning H2 in combustor 28, H2 can be used as an input for fuel cell 14. Water H2O from fuel cell 14 and energy from power source 44 can be used as inputs to electrolyzer 16 to produce H2 and O2. The H2 and O2 can be fed to fuel cell 14, such as a low-temperature fuel cell, for power generation. Heat Q from fuel cell 14, such as steam from waste heat recovery, can be used as an input to emissions capture unit 12 to capture CO2 in flue gas E of GTCC 20.

The advantages of hybrid combined cycle power plant 10 can be seen in a comparison to a conventional GTCC operating without CO2 capture and a conventional GTCC operating with CO2 capture. The three cases can be modeled using software. Case 1 can comprise the new concept of hybrid combined cycle power plant 10 of FIG. 1. Case 2 can comprise operation of an H2-fueled GTCC without CO2 capture. Case 3 can comprise operation of an H2-fueled GTCC with CO2 capture.

Examples of parameters for operating GTCC power plants for Cases 1, 2 and 3 were modeled and a heat balance of fuel cells was calculated based on assumptions of the efficiency and losses. For Case 2 and Case 3, fuel to the GTs has been modeled as comprising 30% H2 (vol %, in combination with natural gas). For Case 1, fuel to the GTs has been modeled as comprising 100% natural gas.

In the example modeled GTCC power plants, the steam bottoming cycle was that of a typical arrangement, which features three pressure levels (HP, IP and LP) with reheat, similarly to how HRSG 22 can be configured. The cooling system was modeled as having a wet surface condenser with a mechanical draft cooling tower. The major assumed parameters of the GTCC and hybrid power plant are listed in Table 1.

TABLE 1

Main Assumptions of Hybrid Power Plant

| Assumptions of Steam Bottoming Cycle of GTCC | | |
|---|---|---|
| HP Steam Pressure at ST (steam turbine) Inlet | bar | 145.1 |
| IP Steam Pressure at ST Inlet | bar | 31.0 |
| LP Steam Pressure at ST Inlet | bar | 6.5 |
| HP Steam Temperature/Hot Reheat Temperature at ST Inlet | °C. | 585 |
| $\Delta T_{pp}$ of HRSG (temperature difference at pinch point) | °C. | 8.3 |
| $\Delta T_{app}$ of HRSG (subcooling at economizer outlet) | °C. | 5.6 |
| Condenser Pressure | kPa | 4.83 |
| Assumptions of $CO_2$ Capture Unit (MEA) | | |
| $CO_2$ Capture Efficiency | % | 90 |
| Boost Fan Pressure Increase | kPa | 10.3 |
| Heat Input of Reboiler | GJ/t $CO_2$ | 2.0 |
| Steam Pressure of Reboiler | bar | 3.4 |
| Assumptions of Fuel Cells | | |
| Efficiency | % LHV | 70 |
| Miscellaneous loss | % | 5 |
| Operating Temperature | °C. | 150 |

The simulations were based on ISO ambient conditions: 1.013 bar, dry bulb temperature of 15° C., and relative humidity of 60%. Simulations for cases 1, 2 and 3 are summarized in Table 2.

The power train includes the gas turbine 20, the heat recovery steam generator 22 and the steam turbine 24, and for Case 1 also includes the fuel cell 14. The auxiliary load of the MEA unit 12 for $CO_2$ capture is estimated. For Case 1, LP steam consumption by MEA unit 12 matches waste heat duty of fuel cells, which determines capacity of fuel cell 14.

As presented in Table 2, highlighted cells (in grey with italic text) indicate the performance improvement of the hybrid system 10. Compared to Case 2 (current state of the art), Case 1 has much better performance: output increased by 187 MW, efficiency higher by 0.8% points and 181 t/h $CO_2$ captured.

For another comparison of like systems, a conventional GTCC burning mixed fuel should also include an MEA CO2 capture unit, because the MEA emission capture unit can impact performance significantly. The comparison between Case 1 and Case 3 indicates the true potential of the systems and methods of the present disclosure: output increased by 221 MW, efficiency higher by 4.4% points and 28 t/h more CO2 captured.

Benefits of the systems and methods of the present disclosure described herein can be attributed to: 1) TIt of GT in Case 1 is not derated (vs. being derated for Cases 2 and 3). That is, by avoiding H2 combustion, it is not necessary to reduce the turbine inlet temperature to maintain current emissions. 2) H2/O2 fuel cell has higher efficiency than GTCC (70% vs. 63%). 3) Extraction steam from the steam turbine ST (Case 3) for CO2 capture is avoided by utilization of waste heat from the fuel cells.

To better understand/compare the cases, a breakdown of total fuel consumption has been presented in Table 3. Thus, for Case 1, fuel consumption comprises natural gas at the combustor and H2 at the fuel cell, while Cases 2 and 3 have fuel consumption of natural gas and H2 at the combustor.

TABLE 2

Performance Data of Power Plant for Cases 1, 2 and 3

| Cases | | | 1 Hybrid Plant w/ $CO_2$ Capture | 2 30% $H_2$-fueled GTCC w/o $CO_2$ Capture | 3 30% $H_2$-fueled GTCC w/ $CO_2$ Capture |
|---|---|---|---|---|---|
| GTCC | Fuel Heat Input to GT | MW th, LHV | 975.5 | 928.4 | 928.4 |
| | GTCC Power Output | MW | 615.4 | 582.3 | 559.9 |
| Fuel Cells | Fuel Heat Input to Fuel Cells | MWth, LHV | 236.6 | — | — |
| | Fuel Cells Power Output | MW | 165.7 | — | — |
| Power Train | Total Fuel Heat Input of Power Train | MWth, LHV | 1,212.2 | 928.4 | 928.4 |
| | Gross Power Output of Power Train | MW | 781.0 | 582.3 | 559.9 |
| | GTCC Auxiliary Load | MW | 2.0 | 2.0 | 2.0 |
| | $CO_2$ Capture Auxiliary Load | MW | 12.0 | — | 11.6 |
| | Net Power Train Output | MW | 767.0 | 580.3 | 546.3 |
| | Net Power Train Efficiency | %, LHV | 63.3 | 62.5 | 58.8 |
| | $CO_2$ emission | kg/MWh | 24.6 | 290.6 | 28.9 |
| | $CO_2$ captured | t/h | 180.8 | — | 152.9 |
| | Performance Difference | | — | (1)-(2) | (1)-(3) |
| | Delta in Power Output | MW | — | 186.7 | 220.8 |
| | Delta in Efficiency | %, LHV | — | 0.8 | 4.4 |

TABLE 3

Breakdown of Fuels for Cases 1, 2 and 3

|  |  | 1 | | 2 & 3 | |
|---|---|---|---|---|---|
| Cases | | NG | H$_2$ | NG | H$_2$ |
| Mass Flow | t/h | 75.7 | 7.1 | 64.1 | 3.1 |
| Ratio | wt % | 91.4 | 8.6 | 95.4 | 4.6 |
|  | vol % | 54.4 | 45.6 | 70.0 | 30.0 |
|  | heat %, LHV | 80.5 | 19.5 | 89.0 | 11.0 |

As shown in Table 3, Case 1 consumes more H2 than Cases 2 and 3 (46% vs. 30%, vol %). This means (at the system level) more H2 fuel can be applied with the new method of hybrid combined cycle power plant 10. Table 3 also indicates that wt % and heat % of H2 fuel are totally different from values in vol %.

As demonstrated by the simulations of Cases 1, 2 and 3, the systems and methods of the present disclosure, including hybrid combined cycle power plant 10, can result in significant performance improvements, as presented in Table 2. Thus, for the specific parameters disclosed, hybrid power plant 10 can achieve improvements such as an output increase of 221 MW, 4.4% higher efficiency and 28 t/h (tons per hour) more CO2 captured.

Figure 2:
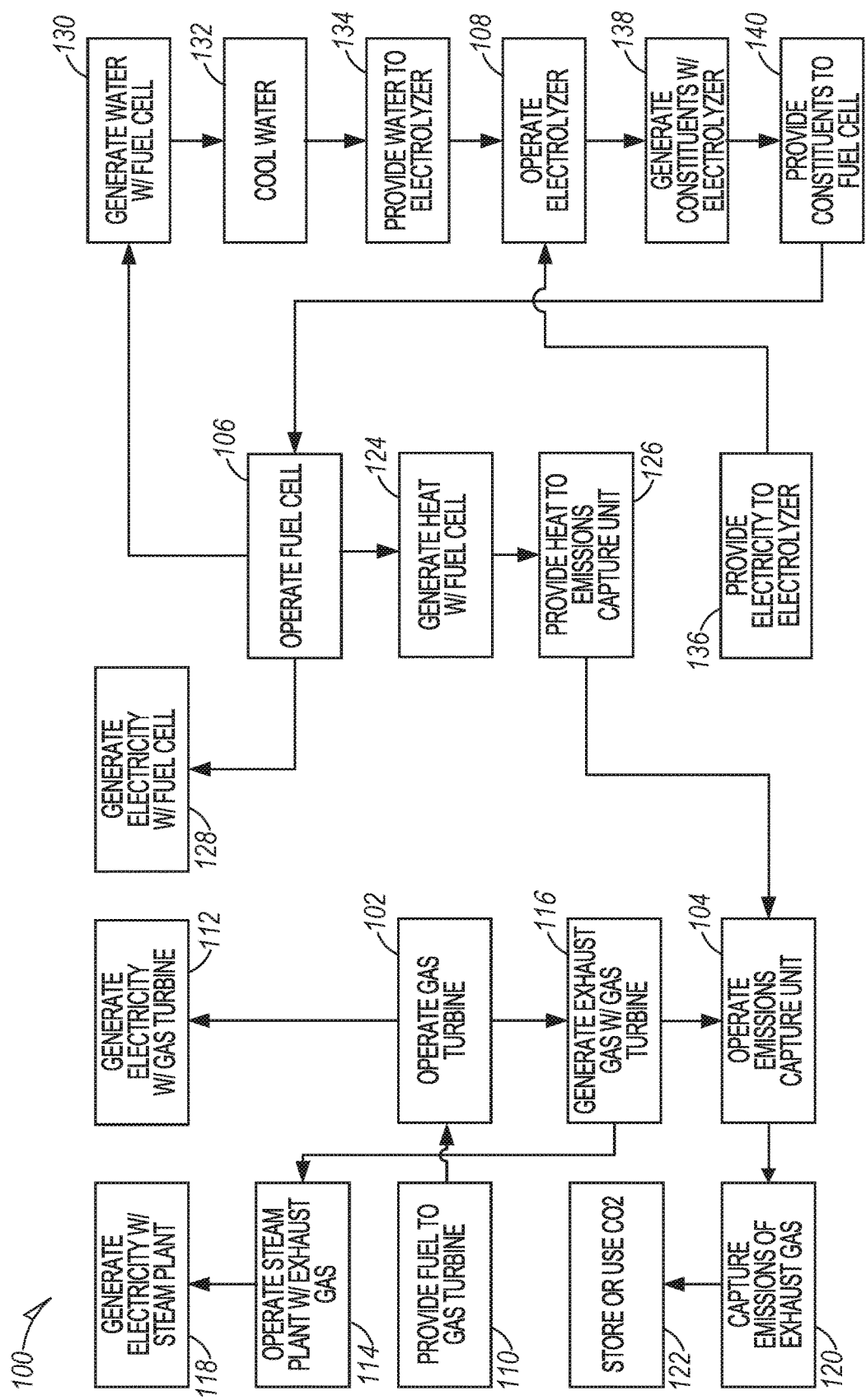
FIG. 2 is a schematic line diagram illustrating methods for capturing emissions from a combined cycle power plant using an emissions capture unit, a fuel cell and an electrolyzer.

FIG. 2 is a line diagram illustrating steps of a method 100 for operating hybrid combined cycle power plant 10 incorporating emissions capture unit 12, fuel cell 14 and electrolyzer 16, as shown in FIG. 1. Method 100 can additionally be representative of the operation of other combined cycle power plants configured similarly to or different than hybrid combined cycle power plant 10. Method 100 can comprise four main processes 102, 104, 106 and 108 that can operate simultaneously, or sequentially in various orders as needed for start-up and shut down, maintenance or partial operation.

At step 102, gas turbine engine 20 can be operated. Air A and fuel F can be provided to combustor 28 to be burned and produce exhaust gas E. A single gas turbine engine is illustrated in FIG. 1, but more than one of gas turbine engine 20 can be used.

At step 104, emissions capture unit 12 can be operated. As discussed, emissions capture unit 12 can comprise a post-combustion, MEA unit. A single emissions capture unit is illustrated in FIG. 1, but more than one of emissions capture unit 12 can be used.

At step 106, fuel cell 14 can be operated. As discussed, fuel cell 14 can comprise a low-temperature, such as alkali fuel cell (AFC). A single fuel cell is illustrated in FIG. 1, but more than one of fuel cells 14 can be used.

At step 108, electrolyzer 16 can be operated. As discussed, electrolyzer 16 can comprise an alkaline electrolyzer to achieve electrolysis of water to produce hydrogen and oxygen using a solid oxide, or ceramic electrolyte. A single electrolyzer is illustrated in FIG. 1, but more than one of electrolyzer 16 can be used.

At step 110, fuel F can be provided to gas turbine engine 20. In examples, the fuel can comprise 100% natural gas. In examples, the fuel can comprise about 50% to about 70% natural gas, with the balance comprising hydrogen (H2).

At step 112, operation of gas turbine engine 20 can be used to generate rotational shaft power that can be used to drive an electrical generator to generate electricity for providing to a power grid. For example, electrical generator 32 can be operated to provide electrical power to a grid system.

At step 114, steam turbine 34 can be operated, such as via steam produced in HRSG 22. Exhaust gas E from gas turbine engine 20 can be used to convert water to steam in HRSG 22. Steam from HRSG 22 can be used to drive steam turbine 34.

At step 116, exhaust gas E from gas turbine engine 20 can be vented to emissions capture unit 12 at step 104. Exhaust gas E can pass from turbine 30, flow through HRSG 22 to produce steam for steam turbine 34, and then into a stack. Emissions capture unit 12 can be connected to the stack to receive exhaust gas E' before exhaust gas E' is passed into the atmosphere.

At step 118, operation of steam turbine 34 can be used to generate rotational shaft power that can be used to drive an electrical generator to generate electricity for providing to a power grid. Steam turbine 34 can provide electrical power to the grid system that is provided power by electrical generator 36.

At step 120, exhaust gas E can be processed by emission capture unit 12. For example, CO2 can be partially or completely removed from exhaust gas E via a MEA process described herein. Other emissions capture technologies can be used and other types of emissions can be captured.

At step 122, CO2 removed at step 120 can be stored in a storage container or vessel. Thus, the stored CO2 can be properly disposed of without being released to the atmosphere. In additional examples, the CO2 can be used for other processes such as refrigeration and cooling cycles.

At step 124, operation of fuel cell 14 can generate heat Q. In examples, fuel cell 14 can generate byproduct heat that can be captured via thermal coupling to a fluid loop. Heat Q from fuel cell 14 can be used to produce low pressure steam that can be fed to emissions capture unit 12. The cooled steam can be returned to fuel cell 14 as condensate C to again be heated for use with fuel cell 14.

At step 126, heat Q from fuel cell 14 can be provided to emissions capture unit 12. The heated fluid of step 124 can be thermally conducted to emission capture unit 12 via fluid loop. For example, heat Q can be provided by steam and cooled steam, or condensate C, can be returned to fuel cell 14 for heating to complete the loop.

At step 128, fuel cell 14 can be operated to generate electric power P. Electric power P can be provided to a grid system, such as the one being provided power by generators 32 and 36. Note, auxiliary loads of hybrid combined cycle power plant 10 can be supported by power supplied through internal electrical system, such as by using a small portion of total power from electrical generators 32 and 36).

At step 130, fuel cell 14 can produce water H2O. Water H2O can be produced as a byproduct of converting O2 and H2 into electricity at fuel cell 14. The water can be at or near the temperature of the fuel cell process, which in examples can reach about 150° C. to about 200° C.

At step 132, water from fuel cell 14 can be cooled. For example, cooler 50 can cool water H2O as it travels from fuel cell 14 to electrolyzer 16. Cooler 50 can comprise a heat exchanger provided with cool water from a cooling tower. In examples, electrolyzer 16 can operate at temperatures less than about 100° C.

At step 134, cooled water from step 132 can be provided to electrolyzer 16. Electrolyzer 16 can consume the cooled water to produce constituent inputs for fuel cell 14 of H2 and O2.

At step 136, electricity can be provided to electrolyzer 16, such as by power source 44. In examples, power source 44 can comprise one or more renewable energy sources such as wind, solar and hydro.

At step 138, electrolyzer 16 can be operated to generate constituents for fuel cell 14, such as H2 and O2.

At step 140, the constituents generated with electrolyzer 16 can be provided to fuel cell 14. As such, method 100 can be continuously operated to generate and consume H2 and O2 to provide a heat input to emissions capture unit 12. Electrolyzer 16 can operate independently from the gas turbine 20, fuel cell 14, emissions capture unit 12, and steam turbine 24, and provide H2 and/or O2 into the containers 46, 48. This is particularly advantageous during those times for which the supply of renewable power may be high and demand for electricity is low. That is, containers 46, 48 can store the H2 and/or O2 when the supply of renewable energy exceeds the demand for electricity and then later produce power via fuel cell 14 (and provide heat to emissions capture unit 12) when the demand for electricity is high.

The systems and methods of the present disclosure can achieve numerous benefits by combining fuel cells, electrolyzers and emissions capture technology, as described in the following examples. Fuel cells can more efficiently utilize H2 fuel compared to conventional GTCC power plants. The effort and expense of altering existing gas turbines, such as by derating the combustor, to accommodate combustion of H2 can be avoided. Heat that is ordinarily wasted from fuel cells can be recovered and effectively utilized for CO2 capture, e.g., as an input to a CO2 capture unit. Water produced in fuel cells can be recycled into an electrolyzer to minimize water usage. Electrolyzers can generate O2 for use with fuel cells, which is more efficient, lower in cost and utilizes more durable equipment than what is typically used to obtain O2 from air. Low-temperature fuel cells have fast start-up capability, which is suitable for use with intermittent renewable electricity to power the electrolyzer. Furthermore, reduction of CO2 emissions is aligned with many government and private decarbonization initiatives. Economies of scale of fuel cells can further reduce the cost of hybrid power plant 10, such as by enabling large-scale fuel cells suitable for use with hybrid power plant 10.

VARIOUS NOTES & EXAMPLES

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A power production facility comprising:
   a combined cycle power plant comprising:
   a gas turbine engine configured to combust a fuel to produce exhaust gas that can be used to produce rotational shaft power for generating electricity; and
   a steam system configured to produce steam with the exhaust gas to rotate a steam turbine for generating additional electricity;
   an emissions capture unit configured to receive the exhaust gas to remove pollutants;
   a fuel cell configured to generate electricity via a reaction process of constituents and to provide byproduct heat to operate the emissions capture unit; and
   an electrolyzer configured generate at least one of the constituents for the fuel cell.

2. The power production facility of claim 1, wherein the fuel is 50%-70% natural gas.

3. The power production facility of claim 1, wherein the fuel is 100% natural gas.

4. The power production facility of claim 1, wherein the emissions capture unit comprises a CO2 capture system that removes CO2 from the exhaust gas.

5. The power production facility of claim 4, wherein the CO2 capture system comprises a monoethanolamine gas treating system.

6. The power production facility of claim 1, wherein the fuel cell comprises a low temperature fuel cell selected from the group comprising at least one of alkali fuel cells (AFC) and phosphoric acid fuel cells (PAFC).

7. The power production facility of claim 1, wherein the fuel cell is productive of water as a byproduct and the electrolyzer is configured to generate H2 gas as the at least one of the constituents from the water byproduct.

8. The power production facility of claim 7, further comprising a storage system to store H2 generated by the electrolyzer.

9. The power production facility of claim 7, further comprising a cooler positioned between the fuel cell and the electrolyzer to cool the water byproduct before entering the electrolyzer.

10. The power production facility of claim 1, further comprising compressors for pressurizing the at least one of the constituents to be provided from the electrolyzer to the fuel cell.

11. The power production facility of claim 1, further comprising a heat exchanger configured to transfer the byproduct heat from the fuel cell to the emissions capture unit via a heat transfer medium.

12. A method of removing emissions from a combined cycle power plant, the method comprising:
   providing a hybrid power plant, the hybrid power plant configured to:
      generate hydrogen gas and oxygen gas with an electrolyzer from a water input using an electrical input;
      generate electricity and heat with a fuel cell from at least the hydrogen gas of the electrolyzer; and
      transfer at least some of the heat from the fuel cell to an emissions capture unit configured to receive exhaust gas from a gas turbine engine of the combined cycle power plant.

13. The method of claim 12, wherein the hybrid power plant is further configured to store or process CO2 emissions captured by the emissions capture system.

14. The method of claim 12, wherein the hybrid power plant is further configured to circulate a heat transfer medium between the emissions capture system and the fuel cell to transfer the heat generated by the fuel cell to the emissions capture system.

15. The method of claim 12, wherein the hybrid power plant is further configured to:
   provide the water input to the electrolyzer from the fuel cell; and
   cool the water input from the fuel cell before being used in the electrolyzer.

16. A power-generating emission capture system for an exhaust gas producing power plant, the system comprising:
   an electrolyzer for generating hydrogen gas and oxygen gas from a water input;
   a fuel cell for generating electricity, and heat from the hydrogen gas of the electrolyzer; and
   an emissions capture unit for capturing emissions from the exhaust gas, the emissions capture unit configured to use the heat from the fuel cell.

17. The system of claim 16, wherein the fuel cell comprises an alkali fuel cell and phosphoric acid fuel cell.

18. The system of claim 16, wherein the water input is produced by the fuel cell, further comprising a cooler for cooling the water input from the fuel cell before the water input is provided to the electrolyzer.

19. The system of claim 16, further comprising:
   a first heat exchanger thermally coupled to the fuel cell;
   a second heat exchanger thermally coupled to the emissions capture unit; and
   a cooling medium for circulating between the first and second heat exchangers.

20. The system of claim 16, further comprising:
   a hydrogen storage tank for storing hydrogen generated by the electrolyzer.

* * * * *